(12) United States Patent
Kilchyk et al.

(10) Patent No.: US 11,988,138 B2
(45) Date of Patent: May 21, 2024

(54) HYBRID PROPULSION SYSTEM WITH INTEGRATED AIR-COOLING SYSTEM

(71) Applicant: Hamilton Sundstrand Corporation, Charlotte, NC (US)

(72) Inventors: Viktor Kilchyk, Lancaster, NY (US); Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/943,830

(22) Filed: Sep. 13, 2022

(65) Prior Publication Data

US 2024/0084732 A1    Mar. 14, 2024

(51) Int. Cl.
*F02C 6/20* (2006.01)
*F02C 3/06* (2006.01)

(52) U.S. Cl.
CPC .................. *F02C 6/20* (2013.01); *F02C 3/06* (2013.01); *F05D 2220/323* (2013.01)

(58) Field of Classification Search
CPC ..................................... F02C 9/18; F02C 6/08
See application file for complete search history.

(56) References Cited

U.S. PATENT DOCUMENTS

| | | | |
|---|---|---|---|
| 6,663,044 B1 * | 12/2003 | Munoz | B64D 13/06 62/93 |
| 10,207,809 B2 | 2/2019 | Koerner et al. | |
| 10,794,290 B2 | 10/2020 | Snape et al. | |
| 11,171,535 B2 | 11/2021 | Lam-Ki et al. | |
| 2012/0192578 A1 * | 8/2012 | Finney | B64D 13/06 62/402 |
| 2012/0242176 A1 * | 9/2012 | Pal | H02K 1/20 310/43 |
| 2013/0040545 A1 * | 2/2013 | Finney | B64D 13/06 454/71 |
| 2018/0342919 A1 * | 11/2018 | Huang | H02K 3/22 |

(Continued)

FOREIGN PATENT DOCUMENTS

EP    3663203 B1    1/2022
WO    2018089458 A1    5/2018

OTHER PUBLICATIONS

Fan Wu and Ayman M. El-Refaie, "Additively Manufactured Hollow Conductors with Integrated Cooling for High Specific Power Electrical Machines," Date Added to IEEE Xplore: Dec. 1, 2020 DOI: 10.1109/ICEM49940.2020.9270871 (Year: 2020).*

(Continued)

*Primary Examiner* — David P. Olynick
(74) *Attorney, Agent, or Firm* — CANTOR COLBURN LLP

(57) ABSTRACT

The present disclosure provides air cooling systems and methods for propulsion systems (e.g., aviation or aerospace propulsion systems). More particularly, the present disclosure provides integrated air cooling systems and methods utilizing air cycle machine cooling for hybrid-electric aircraft or aerospace propulsion systems or the like. The present disclosure provides integrated air cycle machine cooling into the hybrid propulsion system (e.g., into the wing-mounted hybrid propulsion system). As such, the air cooling systems and methods of the present disclosure can minimize weight while improving electric motor/generator cooling.

18 Claims, 4 Drawing Sheets

(56) References Cited

U.S. PATENT DOCUMENTS

| | | | |
|---|---|---|---|
| 2020/0180772 A1* | 6/2020 | Richardson | B64D 13/08 |
| 2021/0031937 A1* | 2/2021 | Schimmels | B64C 1/064 |
| 2021/0123379 A1 | 4/2021 | Katsumata et al. | |
| 2022/0204167 A1* | 6/2022 | Piesker | B64D 13/006 |
| 2022/0255396 A1* | 8/2022 | Pazinski | H02K 7/1823 |
| 2023/0011409 A1* | 1/2023 | Rambo | F02C 9/18 |
| 2023/0011498 A1* | 1/2023 | Zheng | G01S 17/10 |

OTHER PUBLICATIONS

European Search Report for Application No. 23196532.8, dated Feb. 2, 2024, 9 pages.

* cited by examiner

HYBRID PROPULSION SYSTEM WITH INTEGRATED AIR-COOLING SYSTEM

TECHNICAL FIELD

The present disclosure relates to air cooling systems and methods for propulsion systems (e.g., aviation or aerospace propulsion systems) and, more particularly, to integrated air cooling systems and methods utilizing air cycle machine cooling for hybrid-electric aircraft or aerospace propulsion systems or the like.

BACKGROUND

In some configurations of turbo electric (hybrid) airplane propulsion systems, the electric units such as generators or motors can be located next to the thermal engines. The electrical system can require efficient cooling, and the cooling system can be required in a difficult location in the fuselage.

BRIEF DESCRIPTION

The present disclosure provides air cooling systems and methods for propulsion systems (e.g., aviation or aerospace propulsion systems). More particularly, the present disclosure provides integrated air cooling systems and methods utilizing air cycle machine cooling for hybrid-electric aircraft or aerospace propulsion systems or the like.

The present disclosure provides for an air cooling system including a compressed air source for a thermal combustor, the thermal combustor in communication with a turbine; and an electric motor or generator in communication with an electric turbine; wherein a portion of air is configured to be directed from the compressed air source to a heat exchanger and then to the electric turbine; and wherein a portion of expanded air is configured to be directed from the electric turbine to the electric motor for cooling of the electric motor.

In addition to one or more of the features described, or as an alternative to any of the foregoing embodiments, the thermal combustor and the electric motor or generator are included in a hybrid-electric aircraft or aerospace propulsion system.

In addition to one or more of the features described, or as an alternative to any of the foregoing embodiments, the compressed air source is driven by the thermal combustor, or driven by the electric motor or generator.

In addition to one or more of the features described, or as an alternative to any of the foregoing embodiments, the heat exchanger is a skin integrated heat exchanger, and the portion of air directed to the heat exchanger is cooled via outside or ambient air flow.

In addition to one or more of the features described, or as an alternative to any of the foregoing embodiments, the portion of expanded air is configured to be directed to a water separator prior to being directed to the electric motor or generator for cooling of the electric motor or generator.

In addition to one or more of the features described, or as an alternative to any of the foregoing embodiments, wherein a first portion of expanded and water separated air is configured to be directed from the water separator to the electric motor or generator for cooling of the electric motor or generator, and a second portion of expanded and water separated air is configured to be utilized as an air supply for cabin or cargo air cycle cooling of an aircraft or aerospace system.

In addition to one or more of the features described, or as an alternative to any of the foregoing embodiments, the portion of expanded air is configured to be directed to a cooling jacket of the electric motor or generator for cooling of the electric motor or generator.

In addition to one or more of the features described, or as an alternative to any of the foregoing embodiments, the portion of expanded air is configured to be directed to a plurality of hollow wires for cooling of the electric motor or generator.

In addition to one or more of the features described, or as an alternative to any of the foregoing embodiments, the plurality of hollow wires are fabricated via additive manufacturing.

In addition to one or more of the features described, or as an alternative to any of the foregoing embodiments, wherein discharged air from the cooled electric motor or generator is configured to be directed to the thermal combustor.

The present disclosure provides for an air cooling method including providing a compressed air source for a thermal combustor, the thermal combustor in communication with a turbine; and providing an electric motor or generator in communication with an electric turbine; and directing a portion of air from the compressed air source to a heat exchanger and then to the electric turbine; and directing a portion of expanded air from the electric turbine to the electric motor for cooling of the electric motor.

In addition to one or more of the features described, or as an alternative to any of the foregoing embodiments, the thermal combustor and the electric motor or generator are included in a hybrid-electric aircraft or aerospace propulsion system.

In addition to one or more of the features described, or as an alternative to any of the foregoing embodiments, the compressed air source is driven by the thermal combustor, or driven by the electric motor or generator.

In addition to one or more of the features described, or as an alternative to any of the foregoing embodiments, the heat exchanger is a skin integrated heat exchanger, and the portion of air directed to the heat exchanger is cooled via outside or ambient air flow.

In addition to one or more of the features described, or as an alternative to any of the foregoing embodiments, the portion of expanded air is directed to a water separator prior to being directed to the electric motor or generator for cooling of the electric motor or generator.

In addition to one or more of the features described, or as an alternative to any of the foregoing embodiments, wherein a first portion of expanded and water separated air is directed from the water separator to the electric motor or generator for cooling of the electric motor or generator, and a second portion of expanded and water separated air is utilized as an air supply for cabin or cargo air cycle cooling of an aircraft or aerospace system.

In addition to one or more of the features described, or as an alternative to any of the foregoing embodiments, the portion of expanded air is directed to a cooling jacket of the electric motor or generator for cooling of the electric motor or generator.

In addition to one or more of the features described, or as an alternative to any of the foregoing embodiments, the portion of expanded air is directed to a plurality of hollow wires for cooling of the electric motor or generator.

In addition to one or more of the features described, or as an alternative to any of the foregoing embodiments, the plurality of hollow wires are fabricated via additive manufacturing.

In addition to one or more of the features described, or as an alternative to any of the foregoing embodiments, wherein discharged air from the cooled electric motor or generator is directed to the thermal combustor.

The above described and other features are exemplified by the following figures and detailed description.

Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following descriptions should not be considered limiting in any way. With reference to the accompanying drawings, like elements are numbered alike.

Features and aspects of embodiments are described below with reference to the accompanying drawings, in which elements are not necessarily depicted to scale.

Figure 1:
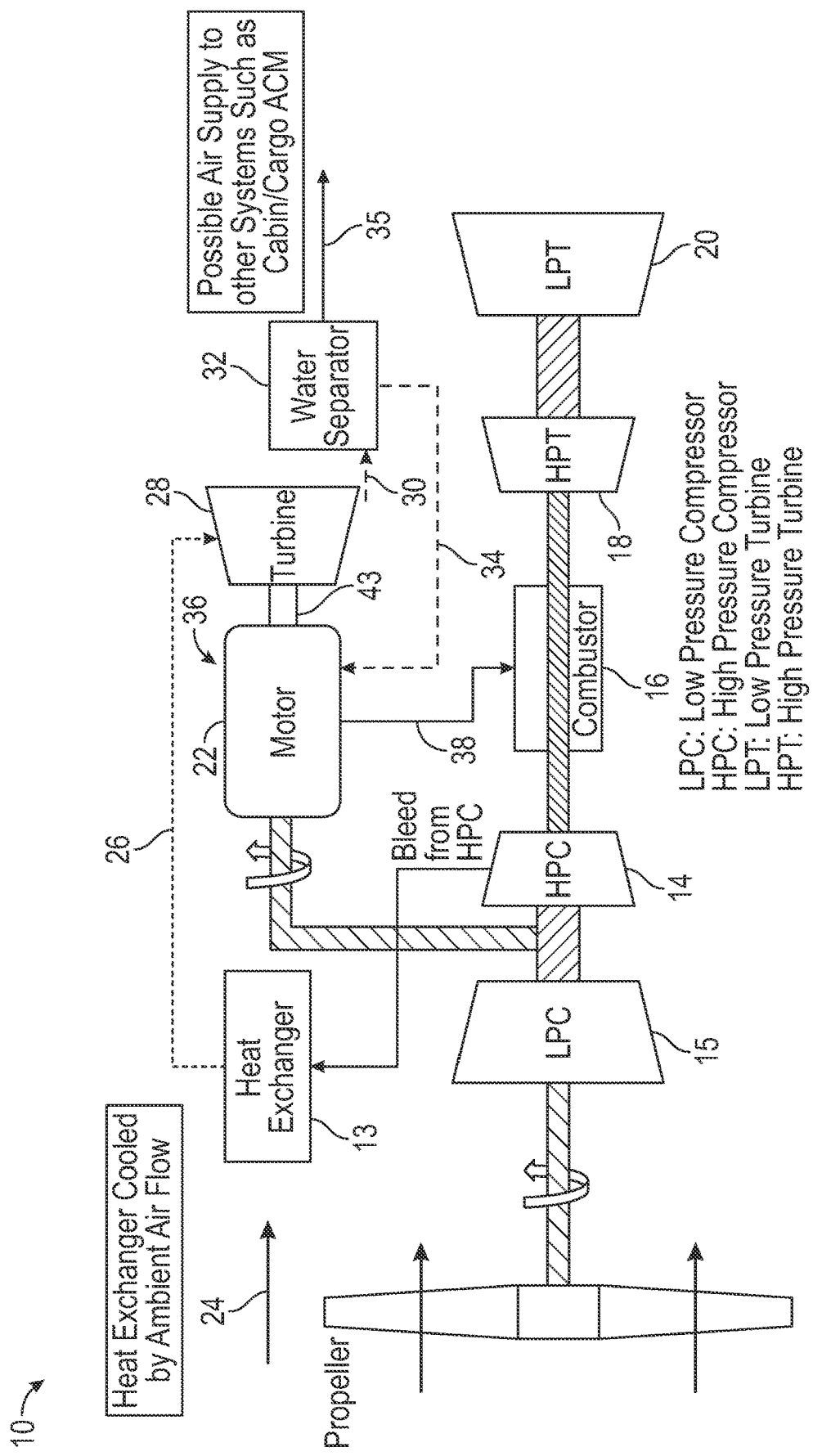
Figure 2:
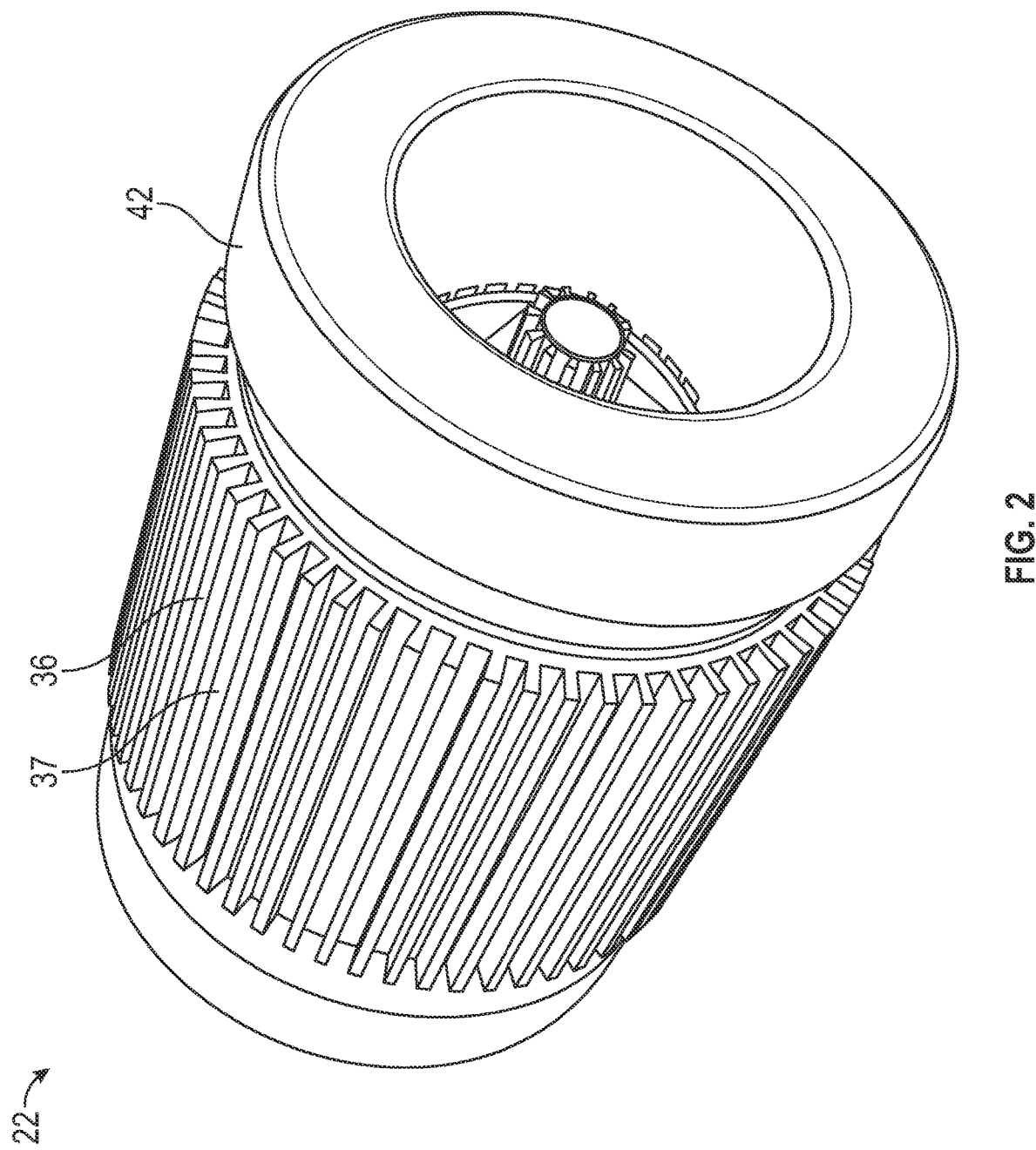
Figure 3:
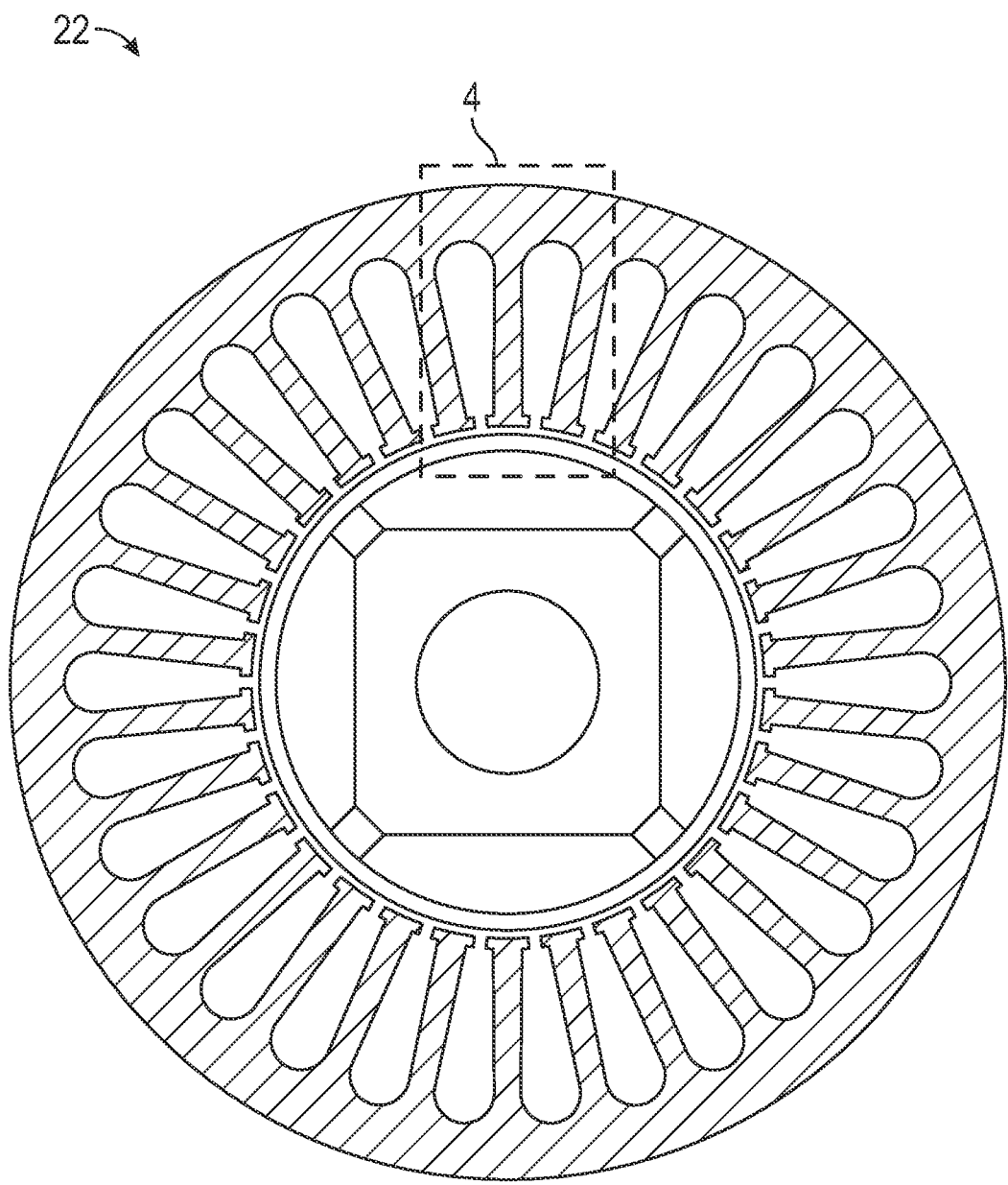
Figure 4:
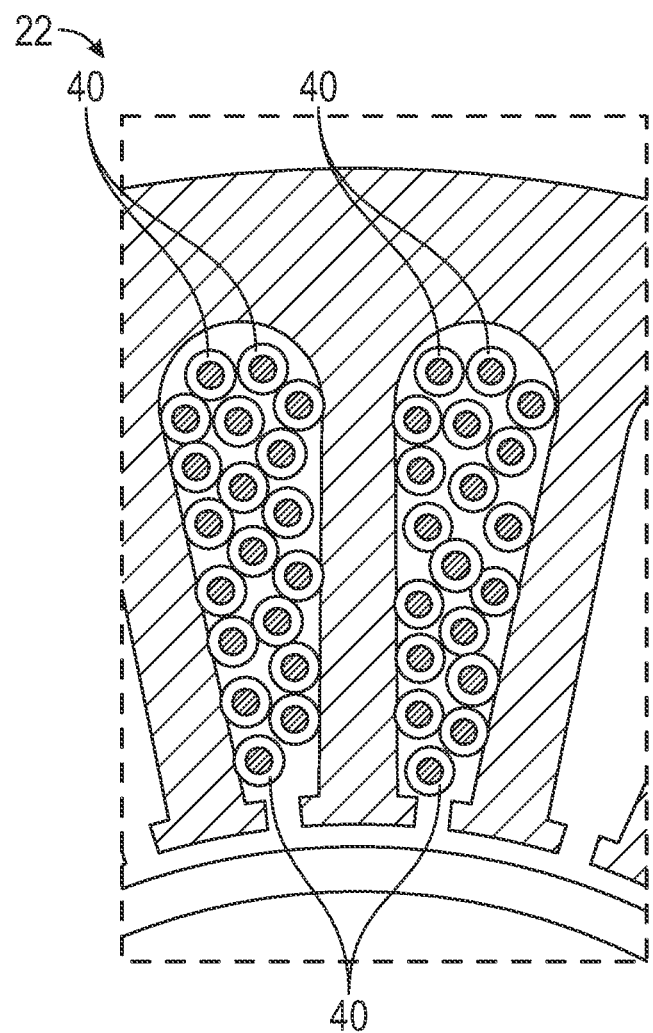
Figure 5:
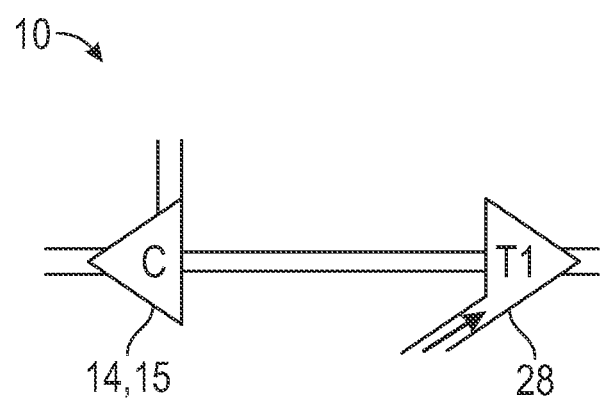

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 1 is a schematic of an example air cooling system, according to the present disclosure;

FIG. 2 is a side perspective view of an example electric motor having motor cooling channels, according to the present disclosure;

FIG. 3 is a cross-sectional view of an example electric motor, according to the present disclosure;

FIG. 4 is a partial exploded cross-sectional view of the electric motor of FIG. 3, the electric motor having hollow wire for cooling, according to the present disclosure; and FIG. 5 is a partial schematic of another example air cooling system, according to the present disclosure.

DETAILED DESCRIPTION

A detailed description of one or more embodiments of the disclosed apparatus and method are presented herein by way of exemplification and not limitation with reference to the figures.

The example embodiments disclosed herein are illustrative of air cooling systems, and assemblies of the present disclosure and methods/techniques thereof. It should be understood, however, that the disclosed embodiments are merely examples of the present disclosure, which may be embodied in various forms. Therefore, details disclosed herein with reference to example air cooling systems and assemblies and associated processes/techniques of fabrication/assembly and use are not to be interpreted as limiting, but merely as the basis for teaching one skilled in the art how to make and use the assemblies/systems and/or alternative assemblies/systems of the present disclosure.

The present disclosure provides air cooling systems and methods for propulsion systems (e.g., aviation or aerospace propulsion systems). More particularly, the present disclosure provides integrated air cooling systems and methods utilizing air cycle machine cooling for hybrid-electric aircraft or aerospace propulsion systems or the like.

Current practice provides that electrical components of turbo electric (hybrid) airplane propulsion systems can require efficient cooling, and such electrical components can be positioned in a difficult location (e.g., next to the thermal engines, etc.). The present disclosure provides integrated air cycle machine cooling into the hybrid propulsion system (e.g., into the wing-mounted hybrid propulsion system). As such, the air cooling systems and methods of the present disclosure can minimize weight while improving electric motor/generator cooling.

FIG. 1 is a schematic of an example air cooling system 10 for propulsion systems (e.g., aviation or aerospace propulsion systems), according to certain embodiments of the present disclosure.

In certain embodiments and as shown in FIG. 1, system 10 is an integrated air cooling system 10 that utilizes air cycle machine cooling for hybrid-electric aircraft or aerospace propulsion systems or the like, as discussed further below.

As shown in FIG. 1, a portion of air 12 can be diverted or directed from a compressed air source 14 for thermal combustor 16 of system 10. The portion of air 12 can be directed to heat exchanger 13, as discussed further below.

In example embodiments, the compressed air source 14 includes a high pressure compressor 14, and high pressure compressor 14 can be in communication with low pressure compressor 15 of system 10. Thermal combustor 16 can be in communication with high pressure turbine 18 and low pressure turbine 20 of the hybrid-electric aircraft or aerospace propulsion and cooling system 10. It is noted that condensed water can be injected into the combustor 16 or high pressure turbine 18 to improve performance.

It is noted that the compressed air source 14 (e.g., high pressure compressor 14) can be driven from the thermal combustor 16 (e.g., including geared arrangement), or driven by the electric motor or generator 22 of the hybrid-electric aircraft or aerospace propulsion and cooling system 10. During ground operation, the motor/generator 22 of the system works in generator mode. Power from a low-pressure spool shaft is transferred by a power take off shaft arrangement, to provide mechanical power to the generator 22. The generator 22 produces electrical power and by suitable power conversion that power is used for electrical load, including battery charging. During takeoff, additional thrust can be desired. The motor/generator 22 of the system works in motor mode. During this mode, electrical power from a battery, through suitable power conversion and inversion, is used to provide electrical power to the motor 22. The motor 22 provides power to the low-pressure spool that includes a propulsion fan, low pressure compressor 15 and low-pressure turbine 20. In this manner additional thrust is provided to the low-pressure spool during takeoff mode. During cruise mode, the motor/generator 22 of the system works in generator mode and produces electrical power for electrical load including battery charging. During the motor mode as well as generator mode, some portion of the shaft power is used to expand compressed and cooled air in the electric turbine 28.

In some embodiments and as shown in FIG. 5, the system 10 utilizes a turbine-driven booster compressor. In such case, the turbine 28 is not being mechanically linked to the motor 22, but works as a stand-alone turbine unit 28 connected to the compressor 14 or 15. In other embodiments, the turbine 28 is connected to the motor 22 via a gear 43 or the like (e.g. mechanical gear, magnetic gear, hydraulic gear, ferrofluidic gear, etc.).

As noted, a portion of air 12 can be diverted or directed from a compressed air source 14 and can be directed to heat exchanger 13. In an example embodiment, heat exchanger is a nacelle skin integrated heat exchanger 13, and the air 12 is cooled via outside or ambient air flow 24. In other embodiments, other suitable types of heat exchangers 13 can be utilized to cool air 12.

Cooled air 26 then exits the heat exchanger 13 and is expanded in the electric turbine 28 of the hybrid-electric aircraft or aerospace propulsion and cooling system 10. In some embodiments, the expanded air 30 can then be passed through an optional water separator 32.

A first portion of expanded and water separated air 34 can be directed from water separator 32 and passed through a cooling jacket 36 of the electric motor or generator 22 for cooling of the electric motor/generator 22. In some embodiments, the cooling jacket 36 can be fabricated via additive manufacturing, as discussed further below. In certain embodiments, cooling jacket 36 is positioned around the stator 42 of electric motor or generator 22 (FIG. 2). In other embodiments, cooling air is directed to cool hollow wire 40 winding end turns, in addition to cooling jacket 36 (e.g., pure copper hollow wiring; hollow wiring fabricated via additive manufacturing, etc.) for the cooling of electric motor/generator 22 (FIG. 4). It is noted that condensed water can be utilized as a complement for additional motor 22 cooling.

After cooling the electric motor/generator 22, discharged air 38 can be returned to thermal combustor 16 or some other location (e.g., turbines 18 and/or 20).

A second portion of expanded and water separated air 35 can be directed from water separator 32 and passed to other aircraft/aerospace locations of system 10 as an air supply 35 (e.g., air supply 35 for cabin/cargo air cycle machine cooling of other aircraft/aerospace locations of system 10).

As shown in FIG. 2, the electric motor 22 can include a cooling jacket 36 having a plurality of cooling channels 37.

As shown in FIGS. 3-4, the electric motor 22 can include conventional or additively manufactured (e.g., 3D printed) hollow wires 40 (e.g., hollow wires 40 having any suitable cross-section, such as oval, circular, etc.). The hollow wires 40 can be configured for internal or external coolant flow (e.g., hydrochlorofluorocarbon refrigerant flow) for cooling electric motor 22. In one configuration, dielectric coolant can flow through the hollow wires 40 to remove heat from the copper wire 40. Absorbed heat from dielectric coolant is removed by an air cooled heat exchanger disposed on the generator/motor 22 outer surface. In another configuration, the hollow wires 40 can be sealed at both ends and work as a heat pipe where heat is transferred by evaporation at the warmer end of the wire 40 and condensation forms at the cooler end of the wire 40. The cooler end of the wire 40 is the end that is directly cooled by air flowing over it, preferably at the end winding 42.

There are many benefits of the systems 10, assemblies and methods of the present disclosure, including, without limitation: lower weight and high/improved reliability of air cycle cooling system 10; additively created hollow wire 40 profile can be optimized for improved magneto-electric and/or thermal properties of motor 22; and/or higher power to weight ratio electric units of system 10 can be constructed/utilized.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The term "about" is intended to include the degree of error associated with measurement of the particular quantity based upon the equipment available at the time of filing the application.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

Although the assemblies, systems and methods of the present disclosure have been described with reference to example embodiments thereof, the present disclosure is not limited to such example embodiments and/or implementations. Rather, the assemblies, systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments.

Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. An air cooling system comprising:
   a compressed air source for a thermal combustor, the thermal combustor in communication with a turbine; and
   an electric motor or generator in communication with an electric turbine;
   wherein the air cooling system is configured to direct a portion of air from the compressed air source to a heat exchanger via a first passageway and then to the electric turbine; and
   wherein the air cooling system is configured to direct a portion of expanded air via a second passageway from the electric turbine to the electric motor or generator for cooling of the electric motor or generator;
   wherein the air cooling system is configured to direct discharge air from the cooled electric motor or generator via a third passage way to the thermal combustor.

2. The air cooling system of claim 1, wherein the thermal combustor and the electric motor or generator are included in a hybrid-electric aircraft propulsion system or an aerospace propulsion system.

3. The air cooling system of claim 1, wherein the compressed air source is driven by the thermal combustor, or driven by the electric motor or generator.

4. The air cooling system of claim 1, wherein the heat exchanger is a skin integrated heat exchanger, and the portion of air directed to the heat exchanger is cooled via outside or ambient air flow.

5. The air cooling system of claim 1, wherein the portion of expanded air is directed to a water separator prior to being directed to the electric motor or generator for cooling of the electric motor or generator.

6. The air cooling system of claim 5, wherein air exiting from the water separator is provided to the electric motor or generator for cooling of the electric motor or generator.

7. The air cooling system of claim 1, wherein the portion of expanded air is directed to a cooling jacket of the electric motor or generator for cooling of the electric motor or generator.

8. The air cooling system of claim 1, wherein the portion of expanded air is directed to a plurality of hollow wires for cooling of the electric motor or generator.

9. The air cooling system of claim 8, wherein the plurality of hollow wires are fabricated via additive manufacturing.

10. An air cooling method comprising:
    providing a compressed air source for a thermal combustor, the thermal combustor in communication with a turbine; and
    providing an electric motor or generator in communication with an electric turbine; and
    directing a portion of air from the compressed air source to a heat exchanger and then to the electric turbine;
    directing a portion of expanded air from the electric turbine to the electric motor or generator for cooling of the electric motor or generator; and
    directing discharged air from the cooled electric motor or generator to the thermal combustor.

11. The method of claim 10, wherein the thermal combustor and the electric motor or generator are included in a hybrid-electric aircraft propulsion system or an aerospace propulsion system.

12. The method of claim 10, wherein the compressed air source is driven by the thermal combustor, or driven by the electric motor or generator.

13. The method of claim 10, wherein the heat exchanger is a skin integrated heat exchanger, and the portion of air directed to the heat exchanger is cooled via outside or ambient air flow.

14. The method of claim 10, wherein the portion of expanded air is directed to a water separator prior to being directed to the electric motor or generator for cooling of the electric motor or generator.

15. The method of claim 14, wherein a first portion of expanded and water separated air is directed from the water separator to the electric motor or generator for cooling of the electric motor or generator, and a second portion of expanded and water separated air is utilized as an air supply for cabin or cargo air cycle cooling of an aircraft or aerospace system.

16. The method of claim 10, wherein the portion of expanded air is directed to a cooling jacket of the electric motor or generator for cooling of the electric motor or generator.

17. The method of claim 10, wherein the portion of expanded air is directed to a plurality of hollow wires for cooling of the electric motor or generator.

18. The method of claim 17, wherein the plurality of hollow wires are fabricated via additive manufacturing.

* * * * *